(12) United States Patent
Guillermin et al.

(10) Patent No.: US 10,207,589 B2
(45) Date of Patent: Feb. 19, 2019

(54) ELECTRIC CABLE AND WINDING DEVICE FOR SUCH A CABLE

(71) Applicant: Commissariat à l'Energie Atomique et aux Energies Alternatives, Paris (FR)

(72) Inventors: Olivier Guillermin, Voreppe (FR); Daniel Chatroux, Teche (FR); Jérémy Dupont, Bourgoin-Jallieu (FR); Daniel Mermin, Sassenage (FR)

(73) Assignee: COMMISSARIAT À L'ENERGIE ATOMIQUE AUX ENERGIES ALTERNATIVES, Paris (FR)

( * ) Notice: Subject to any disclaimer, the term of this patent is extended or adjusted under 35 U.S.C. 154(b) by 37 days.

(21) Appl. No.: 15/320,995

(22) PCT Filed: Jun. 19, 2015

(86) PCT No.: PCT/FR2015/051632
§ 371 (c)(1),
(2) Date: Dec. 21, 2016

(87) PCT Pub. No.: WO2015/197953
PCT Pub. Date: Dec. 30, 2015

(65) Prior Publication Data
US 2017/0151879 A1 Jun. 1, 2017

(30) Foreign Application Priority Data
Jun. 27, 2014 (FR) .................................... 14 56066

(51) Int. Cl.
*H02J 7/00* (2006.01)
*B60L 11/18* (2006.01)
(Continued)

(52) U.S. Cl.
CPC ....... *B60L 11/1816* (2013.01); *B60L 11/1818* (2013.01); *B65H 75/425* (2013.01);
(Continued)

(58) Field of Classification Search
CPC ... Y02T 90/14; Y02T 10/7005; Y02T 90/128; Y02T 10/7088; Y02T 10/163
(Continued)

(56) References Cited

U.S. PATENT DOCUMENTS 2,330,086 A 9/1943 Soffner
4,701,974 A 10/1987 Koenig et al.
(Continued)

FOREIGN PATENT DOCUMENTS

DE 7314566 U 7/1973
DE 20307549 U1 10/2004
(Continued)

OTHER PUBLICATIONS

Written Opinion of the International Searching Authority; International Application No. PCT/FR2015/051632; 6 pages.
(Continued)

*Primary Examiner* — Arun C Williams
(74) *Attorney, Agent, or Firm* — Moreno IP Law LLC

(57) ABSTRACT

The invention relates to a winding device (8) for an electric cable (4, 4a, 4b) including a cylindrical hub (62), perforated (622) at its surface and open (624) at at least one of its ends, the cable having at least one conductor (41, 42, 43, 44) and a sheath (45, 45a, 45b) with an outer surface having an irregular cross-section.

10 Claims, 5 Drawing Sheets

(51) Int. Cl.
 *B65H 75/42* (2006.01)
 *H02G 11/02* (2006.01)
 *H01B 7/42* (2006.01)
(52) U.S. Cl.
 CPC ............ *H02G 11/02* (2013.01); *H02J 7/0045* (2013.01); *B65H 2301/5144* (2013.01); *B65H 2701/34* (2013.01); *B65H 2701/3914* (2013.01); *B65H 2701/528* (2013.01); *H01B 7/426* (2013.01); *Y02T 10/7005* (2013.01); *Y02T 10/7072* (2013.01); *Y02T 90/14* (2013.01)
(58) Field of Classification Search
 USPC .......................................................... 320/109
 See application file for complete search history.

(56) References Cited

U.S. PATENT DOCUMENTS

| | | | |
|---|---|---|---|
| 4,924,039 A | 5/1990 | McAllise et al. | |
| 2011/0061981 A1* | 3/2011 | Ori | B60L 11/1824 191/12.2 R |
| 2011/0204849 A1* | 8/2011 | Mukai | B60L 3/0069 320/111 |
| 2014/0034382 A1* | 2/2014 | Mateski | H02G 11/02 174/74 R |
| 2014/0117144 A1* | 5/2014 | Kinomura | B65H 75/425 242/590 |

FOREIGN PATENT DOCUMENTS

| | | |
|---|---|---|
| DE | 102009042059 A1 | 3/2011 |
| DE | 102011080083 A1 | 1/2013 |
| EP | 2432094 A1 | 3/2012 |
| FR | 2391692 | 12/1978 |
| FR | 2642638 | 8/1990 |
| FR | 2964805 | 3/2012 |
| JP | S62260512 A | 11/1987 |
| WO | 2004062054 A1 | 7/2004 |

OTHER PUBLICATIONS

PCT International Search Report; International Application No. PCT/FR2015/051632; dated Sep. 23, 2015, 2 pages.

* cited by examiner

ELECTRIC CABLE AND WINDING DEVICE FOR SUCH A CABLE

The present patent application claims the priority benefit of French patent application FR14/56066 which will be incorporated herein by reference.

BACKGROUND

The present description generally relates to electric connection systems and, more particularly, to a cable connection system. The present description more particularly applies to a system of cable connection of a motor vehicle battery or the like to be recharged.

DISCUSSION OF THE RELATED ART

The connection, for the recharge thereof, of a motor vehicle battery or battery assembly to an electric power system (electric power grid, photovoltaic panels, etc.) generally comprises a cable, connected on the one hand to an electronic circuit managing the battery charge on the vehicle side and on the other hand to a power supply facility. Most often, the cable is located on the recharge station side. Most often, a cable having a plug at each end is plugged, on the one hand, to the facility and, on the other hand, to the vehicle. Sometimes, the cable is permanently connected to the vehicle.

With the development of electric vehicles, solutions where the cable is stored in the trunk of the motor vehicle have emerged. The user plugs the two ends of the cable, respectively to the vehicle and to the recharge station.

Whatever the adopted solution, the connector cable often tends to drag on the ground, which is particularly impractical and staining for the user.

Further, for security reasons, it should be guaranteed that the battery is connected to ground during its recharge. This currently generates the need for specific sockets dedicated to this application.

Further, current systems are not adapted to recharges on home networks, where the sockets and electric circuits used are not dedicated to such a recharge.

Document WO-A-2004/062054 describes an electric cable storage device including a hub having the cable wound around it, the capable being provided with spacers.

Document EP-A-2432094 describes an electric charger where a cable winding device is equipped with a temperature detector at the level of the hub of the winding device.

SUMMARY

An embodiment aims at overcoming all or part of the disadvantages of usual systems of connection of a battery to a recharge facility.

Another embodiment aims at providing solutions which require no modification of or action on the facility supplying the electric power.

One of the constraints of the recharge of a motor vehicle battery is that the charge current is capable of generating a heating of the recharge cable. Unless one accepts providing conductor cross-sections incompatible with economical and bulk constraints, the use of cable winding devices is proscribed, usual ventilated winding device techniques being incompatible with the needs of a motor vehicle battery charge.

An embodiment aims at providing an electric cable compatible with a wound operation.

Another embodiment aims at providing a cable winding device.

Another embodiment aims at providing a solution optimizing the cross-section of the conductors to be used for the electric cable.

Another problem encountered with the recharge of electric vehicles is linked to the user's security against electrocutions, in particular due to the metal parts of the vehicle body frame.

In a dedicated facility, of recharge station type, the station verifies the battery connection by means of control signals exchanged therewith. Such a solution is however incompatible with the use of recharge sockets in home installations which are not specifically provided for such a recharge.

An embodiment aims at protecting, from an electric point of view, a connection to a recharge facility and, in particular, at making sure that the connection includes a ground connection.

During a recharge of a motor vehicle and, more particularly when using a facility which is not specifically provided for such a recharge, a heating of the socket having the charger plugged thereto can sometimes be observed on the side of the electrical system. Such a problem is generally not posed in dedicated recharge stations, which are sized to supply the required current. However, when a user is supposed to recharge his/her vehicle (on a standard socket), the nature and the capacity of the electrical system cannot be guaranteed, and sometimes, dangerous heatings occur at the connector level.

Temperature sensors are sometimes provided at the level of the battery to control the charge thereof, or even at the level of the dedicated facility of a service station. However, such solutions are incompatible with a need for a connection to home installations.

An embodiment aims at protecting the use of home sockets for the recharging of an electric vehicle battery.

Thus, an embodiment provides a winding device for an electric cable comprising a cylindrical hub, perforated at its surface and open at at least one of its ends, the cable having at least one conductor and a sheath with an outer surface having an irregular cross-section.

According to an embodiment, portions protruding from the outer surface of the sheath define air circulation spaces between turns of the cable when the latter is wound.

According to an embodiment, the air circulation spaces are, along the entire length of the wound cable, axial and radial.

According to an embodiment, the sheath comprises, at regular intervals, rings protruding from the outer surface.

According to an embodiment, the sheath comprises a portion, protruding from its outer surface, defining a portion having non-contiguous turns coaxial to the cable.

According to an embodiment, the cable comprises, at one of its ends, a plug integrating at least one temperature sensor.

According to an embodiment, the cable comprises two ground connection conductors, isolated from each other.

According to an embodiment, the device further comprises a fan blowing air in a direction approximately coaxial to the hub.

According to an embodiment, the device further comprises an element for rotating the hub.

According to an embodiment, the device further comprises a casing comprising at least one opening at its lower surface.

An embodiment also provides a system for charging at least one motor vehicle battery, comprising an electric connection device.

BRIEF DESCRIPTION OF THE DRAWINGS

The foregoing and other features and advantages will be discussed in detail in the following non-limiting description of specific embodiments in connection with the accompanying drawings, among which.

DETAILED DESCRIPTION OF THE PRESENT EMBODIMENTS

Figure 1:
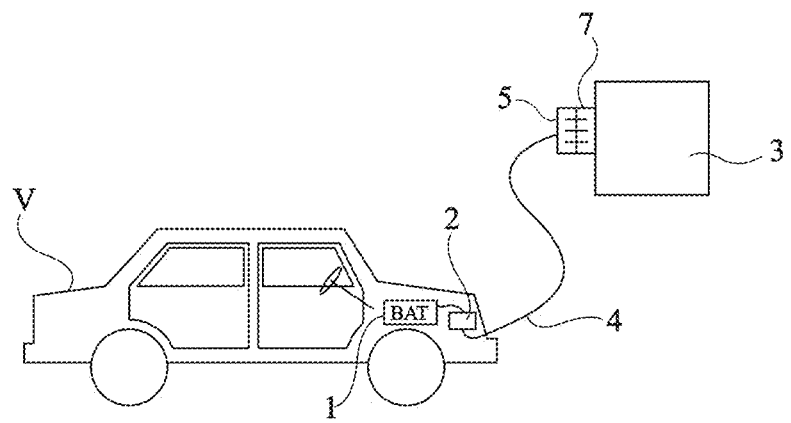
FIG. 1 very schematically shows an example of a motor vehicle battery charging system and such a vehicle.

The same elements have been designated with the same reference numerals in the different drawings. For clarity, only those steps and elements which are useful to the understanding of the described embodiments have been shown and will be detailed. In particular, the forming of a battery has not been detailed, the described embodiments being compatible with usual batteries. Further, the forming of a battery charger has not been detailed otherwise than for the needs of the present description, the described embodiments being, for the rest, here again compatible with usual chargers. Moreover, to ease the understanding, the drawings are not to scale. Unless otherwise specified, expressions "approximately", "substantially", and "in the order of" mean to within 10%, preferably to within 5%.

FIG. 1 very schematically shows an example of a motor vehicle battery charge system and such a vehicle.

An electric or hybrid vehicle V comprises one or a plurality of batteries 1 (BAT) intended to supply thereto the energy necessary to propel it. Such batteries are connected to one or a plurality of charge and control devices 2 (chargers) intended to control their charge when they are plugged to an electric power supply facility 3. Facility 3 may be a public recharge terminal of gas station type, a home installation (for example, at the vehicle user's home), etc.

In the following description, reference will be made for simplification to "a" battery. However, the vehicles generally comprise an assembly of a plurality of batteries and all that will be described hereafter applies whatever the number of batteries which forms "the" vehicle battery, these batteries being generally recharged via a common device.

Two motor vehicle battery charge modes can essentially be distinguished.

In a so-called "fast charge" mode, the battery is charged under a current of several tens of amperes (for example, in the order of 150 A). In this case, the charge is performed from specific facilities equipped with a cable of adapted cross-section and with security devices. The free end of the cable is then plugged to a socket of the vehicle.

The development of electric vehicles, the duration necessary to recharge their battery (as compared with the rapidity of a tank filling) and their battery life generate a need to multiply possible recharge points. In particular, it is desired to be able to connect a battery charger to a standard socket of a home installation.

A so-called "slow charge" mode, which is more specifically considered in the embodiments which will be described, is here used. The battery is charged under a current of at most a few tens of amperes, typically under a current compatible with the use of sockets of a home installation. For example, in France, this amounts to being able to charge the battery from a so-called 16 A socket. The battery connector cable for a recharge, instead of being necessarily located on the recharge station side, is now more and more often on the vehicle side. This generates, among others, constraints in terms of bulk. Currently, electric vehicles are generally provided with a "loose" cable, intended to be connected on the one hand to the vehicle and on the other hand to an electric power supply socket.

A slow charge may last for more than ten hours. Manipulations by the user should be eased while guaranteeing his/her comfort and security.

Further, the fact for the battery to be capable of being recharged at other locations that dedicated stations results in that it may be desired for the vehicle to be equipped with a greater cable length.

Further, the need to recharge the battery from home installations which are not necessarily provided for this purpose generates many other constraints.

Among such constraints, one should note:
  the need for a reliable connection to ground for security reasons, particularly, due to the metal body frame of the vehicle which may, in case of a vehicle isolation fault during the battery charge, be taken to a potential capable of being a danger;
  the intensity continuously sampled by the battery charge, for a relatively long time (typically, several hours) as compared with the durations of connection of the home equipment, which may generate a heating of the sockets and of the cables;
  the fact for the vehicle user to be inexperienced in terms of electrical constraints;
  the impossibility to modify all existing electric systems to provide them with test and security equipment;
  the need to be able to charge a vehicle at different locations (for example, different countries) where the facilities do not necessarily have the same security criteria.

It would be desirable to have solutions taking into account all or part of these constraints.

In the example of FIG. 1, the connection of charger 2 is performed by means of a cable 4 provided, at its end on the side of facility 3, with a plug 5 intended to be engaged into a socket 7 of the facility. On the side of charger 2, the end of cable 4 is either permanently connected to the charger (shown case), or also connected via a plug.

Figure 2:
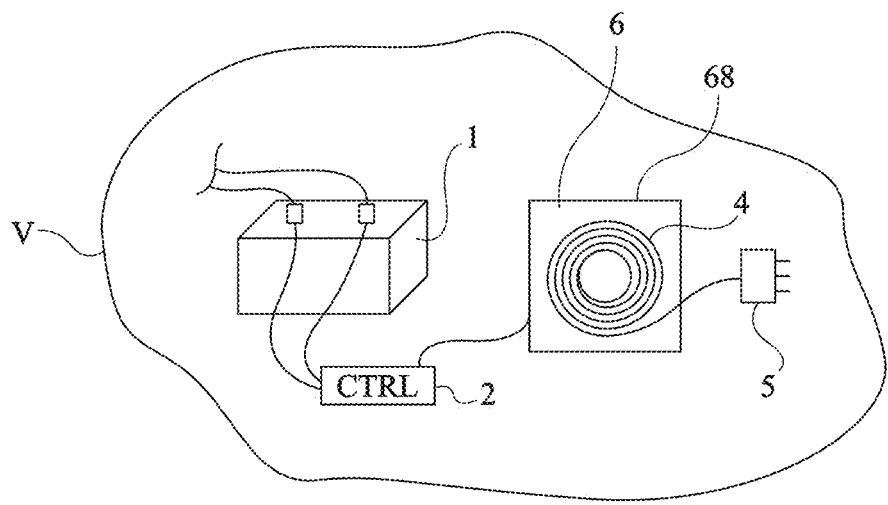
FIG. 2 schematically shows an embodiment of equipment internal to the vehicle.

FIG. 2 schematically shows an embodiment of equipment internal to vehicle V.

According to this embodiment, a device 6 for winding cable 4 enabling to decrease the bulk thereof is provided on the vehicle side. A (fixed) end of cable 4 is connected to charger 2 (CTRL). The other roll-out end of the cable is connected to plug 5.

Due to the intensities implemented during the recharge of a vehicle battery, a usual cable cannot be used while it is wound. Indeed, the cable will heat up and the heat cannot be dissipated, which results in risks of melting, or even of fire. Thus, either the user would have to be constrained to fully unwind the cable for the recharge, or the cable cross-section would have to be oversized to avoid heating too much. In the first case, the cable will drag on the ground and get dirty, which is particularly disturbing during a recharge in locations which are not clean. Further, the user risks not respecting this constraint, which comprises risks. In the second case, this leads to unrealistically increasing the cost of the cable and to increasing the bulk thereof.

Ventilated cable winding devices have already been provided to attempt overcoming this phenomenon in other home applications. However, the solutions adopted in such applications cannot be transposed to an application to the recharge of electric vehicle batteries, particularly due to the specific constraints of this application.

In particular, in most electric applications where the equipment (for example, a gardening tool) risks remaining plugged for a sufficiently long time to generate a heating of the cable, the equipment is displaced by the user. Accordingly, the complete unwinding of the cable is often necessary for other reasons than heating. Further, the cable is regularly displaced and thus does not remain in a heap. This is not true for the recharge of a vehicle which is motionless during the recharge, the cable length and its position thus remaining fixed during the entire recharge.

Further, solutions used for the vacuum cleaners, which comprise using a powerful fan, or the suction power of the actual vacuum cleaner (which is a depression in the order of 0.3 bar ($3.10^4$ Pa)), at the level of the winding device are not appropriate. Indeed, when the fan is used in a vacuum cleaner (or a winding device used to power an electric tool), the motor of the vacuum cleaner or of the tool is already noisy and the noise added by the fan is thus negligible. Further, the fan does not remain in operation when the vacuum cleaner or the tool is not used. Now, a vehicle battery is recharged while the vehicle is not in use. The fact for the charger to have to remain plugged in the absence of the user and in home locations generates a strong constraint in terms of noise.

An electric cable having a specific structure is provided. The inner structure of the cable comprises as many conductors as necessary, isolated from one another inside of a sheath, in the same way as a usual cable. However, the outer surface of the sheath has an irregular cross-section.

In other words, the outer surface has portions protruding from a bottom or base. The function of such protruding portions or of such irregularities is to define air circulation spaces through the cable reel when the cable is wound on itself or through superposed sections of this cable (for example, if the cable is laid in a heap).

Figure 3:
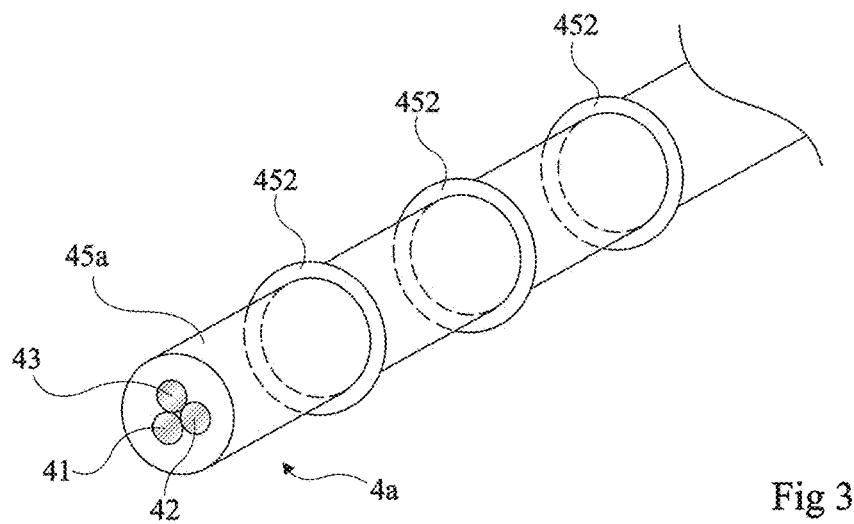
FIG. 3 is a partial perspective view of an embodiment of a cable.

FIG. 3 is a partial perspective view of an embodiment of a cable 4a.

For example, cable 4a comprises three conductors 41 (for example, for the phase), 42 (for example, for the neutral), and 43 (for example, for the ground), individually isolated from one another, and then embedded in an isolating sheath 45a. Sheath 45a comprises, at its outer surface, preferably at regular intervals, gadroons or rings 452, creating irregularities in this outer surface. Between the rings, the outer surface of the sheath has an inner diameter (or diameter of the base of the sheath). The outer diameter of the rings (or height of the surface irregularities) defines, with respect to the inner diameter, air circulation intervals or spaces.

The interval between rings 452 and their outer diameter, conditioning the size of the air circulation spaces, depend on the application and, particularly, on the quantity of heat to be removed which depends, among others, on the cross-section of the conductors and on the current intensity to which they should be submitted.

Figure 4:
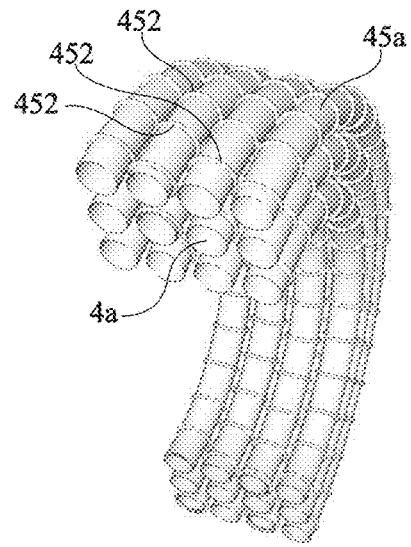
FIG. 4 is a partial perspective view of the cable of FIG. 3 when wound.

FIG. 4 is a partial perspective and cross-section view of cable 4a of FIG. 3 when wound.

Figure 5:
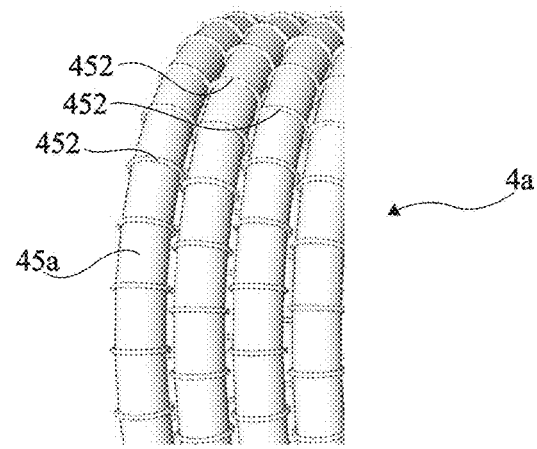
FIG. 5 is another partial perspective view of the cable of FIG. 3 when wound.

FIG. 5 is another partial perspective view of cable 4a of FIG. 3 when wound.

For simplification, only the outer surface of sheath 45a has been illustrated in FIGS. 4 and 5.

These two drawings show that, when cable 4a is wound on itself, rings 452 creates a separation between the base of the sheath of the different sections which come on top of one another, thus creating air circulation spaces. Further, due to the winding, the diameter of the turns of the reel varies from one turn to the other so that few rings 452 end up in front of one another. Further, including in the axial direction of the reel, the winding results in that rings 452 have very little risk of being aligned for a plurality of turns. Accordingly, the air circulation channels follow patterns, both in the radial direction and in the axial direction of the winding.

Figure 6:
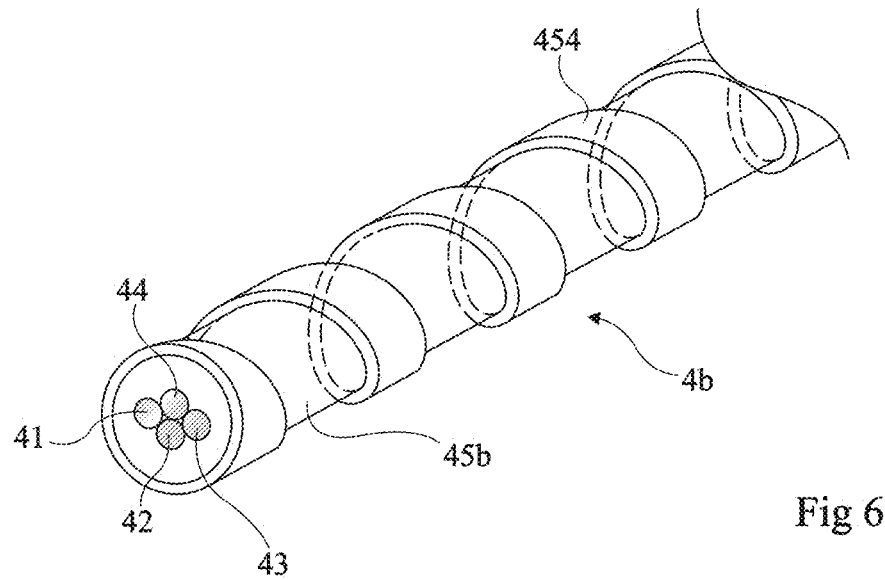
FIG. 6 is a partial perspective view of another embodiment of a cable.

FIG. 6 is a partial perspective view of another embodiment of cable 4b.

According to an embodiment, sheath 45b comprises a portion 454, protruding from its outer surface, defining a portion with non-contiguous turns coaxially wound around the cable. Thus, one can find between the non-contiguous turns of portion 454 a base having a diameter smaller than the outer diameter of portion 454. The base of sheath 45b thus also has the shape of a winding, coaxial to the cable axis, of non-contiguous turns. As in the embodiment of FIG. 3, the diameter difference between the inner and outer diameters of the surface of sheath 45b, and the pattern with non-contiguous turns, create air circulation channels when the cable is wound on itself, in the axial and radial directions of the winding.

The interval between turns 454 and their outer diameter, conditioning the size of the air circulation spaces, here again depend on the application and particularly on the quantity of heat to be removed.

The embodiment of FIG. 6 illustrates a variation at the level of the composition of the cable, which here comprises four conductors 41, 42, 43, and 44. It may be a cable equipped with a control wire or pilot wire or with a cable having two ground conductors 43 and 44, isolated from each other, as will be seen in relation with the third aspect, which will be described hereafter.

Other forms of surface irregularities may be provided, provided for them to define, for the wound cable, air circulation channels in the axial and radial directions of the winding.

Further, the number of conductors may vary. For example, the cable may include a plurality of pilot wires. According to another example, for a cable intended for a three-phase connection, 5 conductors (3 phases, 1 neutral, 1 ground) or 6 conductors (3 phases, 1 neutral, 2 grounds) may be provided.

Preferably, sheath 45 is one-piece, for example formed by extrusion of plastic material.

Preferably, the thickness difference between the outer diameter of rings 452 or of portion 454 and the diameter of the base of cable 4a or 4b is greater than approximately 3 millimeters. Similarly, the interval between rings 452 or between turns of portion 454 in the axial direction is greater than approximately 3 mm, preferably greater than approximately 1 cm. Such minimum dimensions favor the circulation of air by simple natural convection.

As a specific embodiment, for a cable 4 having its conductors 41 to 43, or 41 to 44, made of copper and having a cross-section of approximately 2.5 mm$^2$, the inner diameter of the base of sheath 45 (45*a* or 45*b*) is approximately 1 cm and the outer diameter of rings 452 or of portion 454 is approximately 1.4 cm.

The representations of FIGS. 3 to 6 are simplified and functional. The practical forming of such cables is within the abilities of those skilled in the art based on the functional indications given hereabove, by using, for the rest, usual cable manufacturing techniques and according to the current intensity for which the cable is intended and to the cross-section of the conductors.

For a given conductor cross-section, such a cable structure allows, for a same heating, the flowing of a current having an intensity greater than that of a usual cable when the cable is wound.

A cable 4 (4*a* or 4*b*) thus formed may, in a simplified embodiment, be used with a standard winding device, since the natural convection through the turns may be sufficient to cool it down.

However, according to a preferred embodiment, it is provided to associate cable 4 with a specific winding device.

Figure 7:
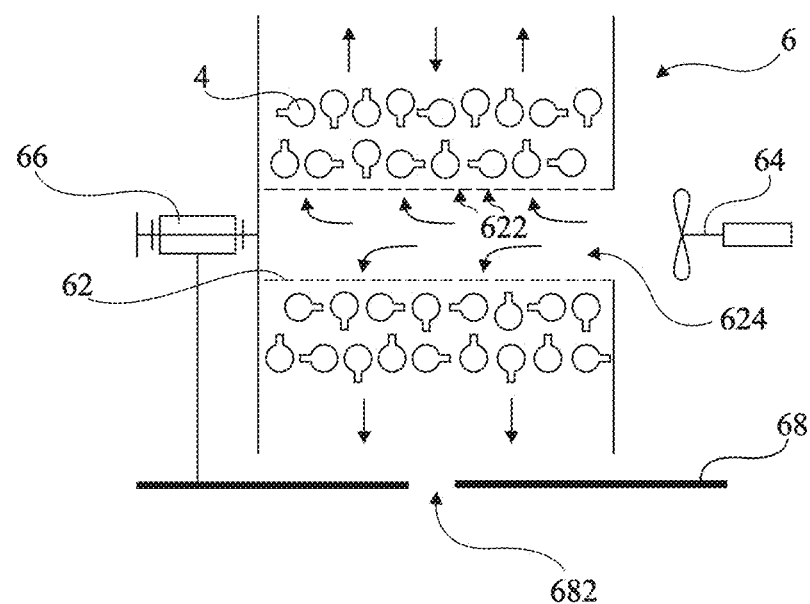
FIG. 7 is a simplified representation of an embodiment of an electric cable winding device, equipped with an embodiment of a cable.

FIG. 7 is a simplified representation of an embodiment of an electric cable winding device 6, equipped with an embodiment of a cable 4.

According to this embodiment, winding device 6 comprises a cylindrical hub 62, perforated at its surface (openings 622) and open (opening 624) at one of its ends. The function of openings 622 and 624 is to improve the circulation of air through cable 4. The larger the number of openings, the better. A compromise will thus be performed with the mechanical resistance desired for hub 62. Preferably, openings 622 have a diameter, or are inscribed within a diameter, greater than 3 millimeters. The inventors have indeed observed that from a 3-mm diameter, the air circulation is improved.

Preferably, winding device 6 further comprises a fan 64 blowing air into the hub in a direction approximately coaxial to the hub (from open end 624). Preferably, the hub is then only open at one of its ends to force the pulsed air to flow through openings 622, and then to flow through wound cable 4. A significant difference with usual winding devices is that the air circulation channels, formed in cable 4, take part decreasing the fan power. Indeed, with a usual winding device, the fan power should enable to force the circulation between contiguous turns of the wound cable, which is in practice almost impossible and incompatible with a low noise. Here, due to the air circulation channels, the resistance to the flowing of air is low and the fan may have a low power, and thus be silent and less expensive. For example, the ventilation may be ensured by a fan providing an overpressure of a few mbar ($10^2$ Pa).

Optionally, winding device 6 comprises an element 66 for rotating the hub. It for example is a spring device which is automatically cocked as the user unwinds cable 4. According to another example, a cable rewinding motor, driven by the power supplied by the battery, is used.

Preferably, winding device 6 and its different components are housed in a casing 68 (FIG. 2), partially shown in FIG. 7. The casing avoids for elements to block the operation of the winding device. Preferably, casing 68 comprises, in its lower portion, one or a plurality of openings 682 used to remove possible impurities accumulated around the cable and which fall by gravity, or water if cable 4 is wet during its rewinding.

The representation of FIG. 7 is simplified and functional, the practical forming of such a winding device being within the abilities of those skilled in the art based on the functional indications given hereabove.

Figure 8:
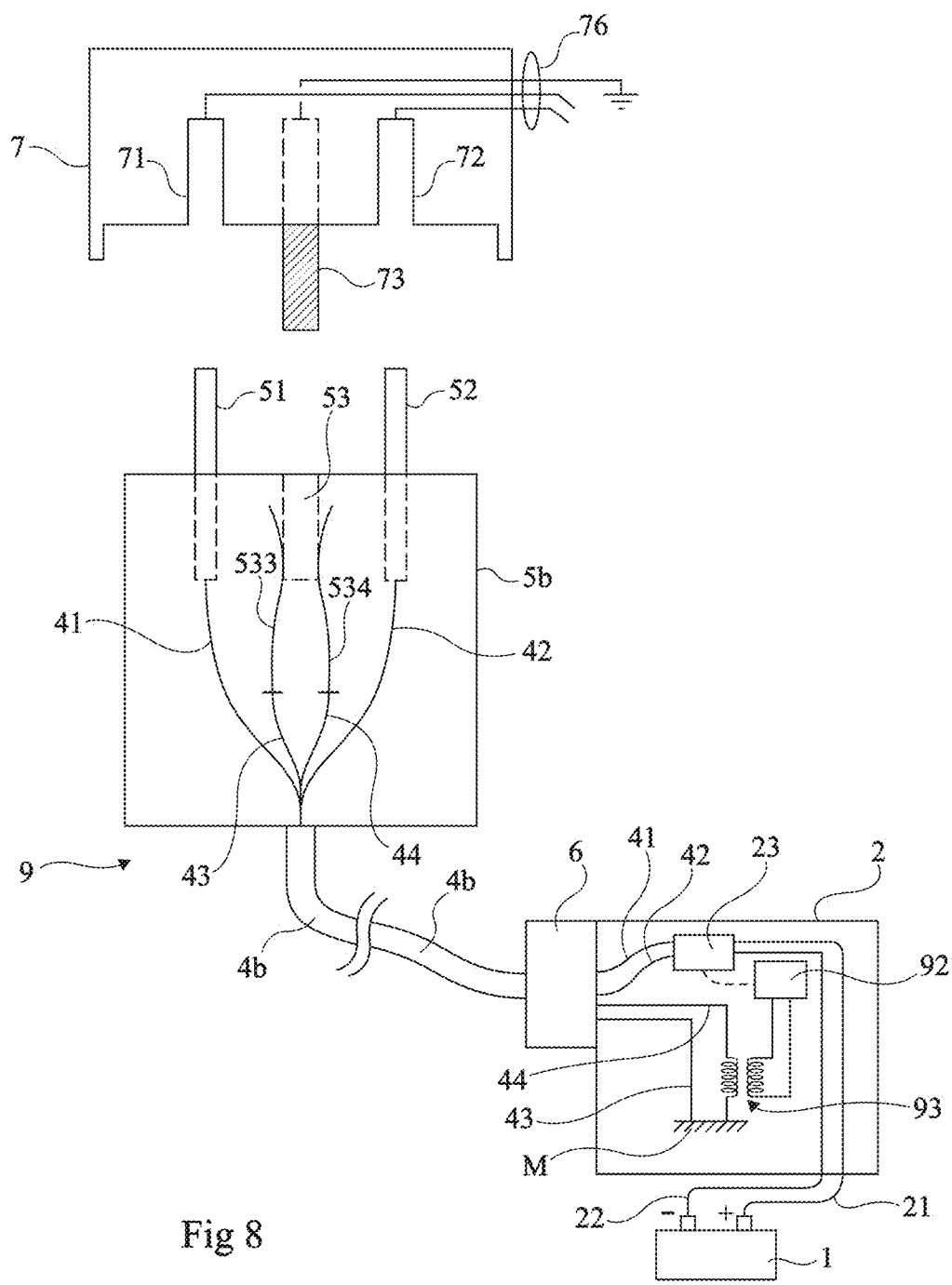
FIG. 8 very schematically shows an embodiment of a plug connector and of a cable, associated with a ground connection detection circuit.

FIG. 8 very schematically shows an embodiment of an electric connection device 9. This for example concerns the connection of a charger 2 of motor vehicle battery 1 to a socket 7 of an electric power supply facility (not shown).

Figure 9:
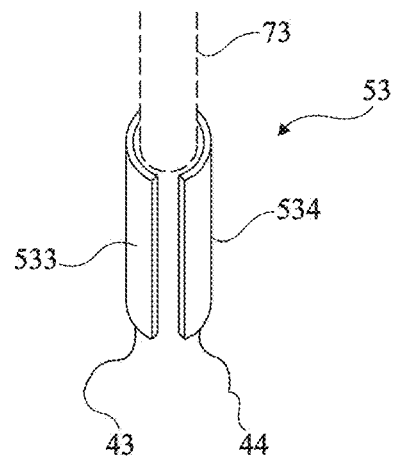
FIG. 9 shows a detail of the plug of FIG. 8.

FIG. 9 is a partial perspective view of an embodiment of a female connector 53 of a plug 5*b* of the device of FIG. 8.

Cable 4 (for example, of the type of cable 4*b*, FIG. 6) comprises two conductors 43 and 44 intended to be connected to ground. These two conductors are individually connected to two distinct portions 533 and 534 of a connector 53 of plug 5*b*. These two portions 533 and 534 are not in electric contact with each other as long as the plug is not engaged in a socket 7. For example, portions 533 and 534 each form a sector of a female connector having a generally cylindrical shape (FIG. 9), intended to receive a male connector 73 of a socket 7. Thus, plug 5*b* has one connector less than the number of conductors of cable 4*b*.

In the example of FIG. 8, socket 7 comprises two female connectors 71 and 72 intended for the (male) connectors 51 and 52 of plug 5*b*, and one male connector 73. Connectors 71 to 73 are connected to wires (generally designated as a cable 76) of the electric power supply facility.

When plug 5*b* is engaged into socket 7, ground conductor 73 (in dotted lines on the side of plug 5*b* in FIG. 8) electrically contacts the two portions 533 and 534 and thus connects conductors 43 and 44.

At the other end of cable 4*b*, for example, at the level of charger 2 of battery 1, conductors 41 and 42 are connected to the actual charger, for example, via a rectifier 23. Two conductors 21 and 22 of the charger are connected to the terminals (positive (−) and negative (+)) of battery 1. One of conductors 43 and 44 (for example, conductor 43) is directly connected to ground M (metal body frame) of the vehicle. The other ground conductor 44 is also connected to ground M, but via an electronic circuit 92 for verifying the electric continuity between conductors 43 and 44. On the battery side, it typically being a traction battery, the latter is generally isolated.

For example, circuit 92 generates an AC signal, preferably at a frequency different from that of the AC voltage supplied by the electric power grid, that it transmits on conductor 44 via a transformer 93. Circuit 92 detects the circuit impedance by measuring the current and the supplied voltage.

In the absence of an electric continuity ensured by a socket 7, the circuit is open and the impedance has a strong value, the current is close to zero. When the continuity is ensured, a current flows and the impedance is low.

Other embodiments of a continuity detection circuit may be provided to detect the ground connection of at least one of conductors 43 or 44.

An advantage of the solution described in relation with FIGS. 8 and 9 is that it is compatible with standard sockets 7 of existing home installations.

Another advantage is that the entire detection (the detection electronics) is on the charger side. Thus, no action is necessary on the electric power supply facility side.

The representation of FIG. 8 is simplified and functional. In particular, the practical embodiments of a continuity detection circuit on the side of charger 2, and of a connector, female or male, capable of establishing the continuity between the two conductors 43 and 44 in the presence of a ground connector, male or female, 83 of a socket 7, are within the abilities of those skilled in the art based on the functional indications given hereabove.

Further, although an example where an end of the cable is permanently connected to charger 2 has been described, a cable having its two ends equipped with a plug 5b, or even a cable having one end equipped with a plug 5b and having its other end equipped with a socket 7, may be provided. Further, although an application to the charging of a motor vehicle is an application where such an electric connection device has many advantages, this device may be used in other applications where a ground connection is desired to be verified.

Figure 10:
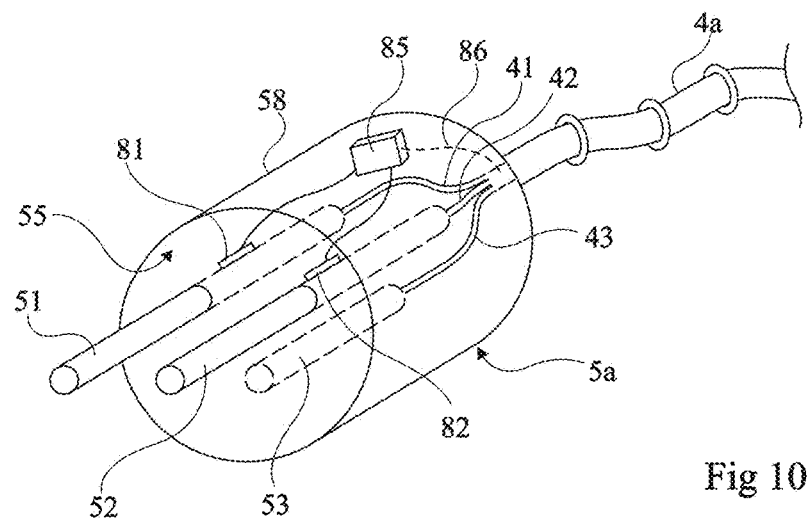
FIG. 10 shows an embodiment of a temperature detection device, associated with a plug.

FIG. 10 shows an embodiment of a temperature detection device, associated with a plug 5a.

Figure 11:
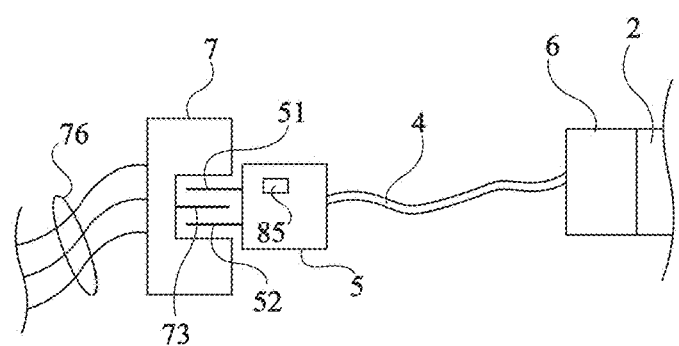
FIG. 11 very schematically shows an embodiment of an electric connection system using a plug of the type in FIG. 10.

FIG. 11 very schematically shows an embodiment of an electric connection system using a plug 5a of the type in FIG. 10.

In the example of FIG. 10, a plug called 2P+T, that is, with three conductors (phase, neutral, and ground) is assumed. Usually, plug 5a comprises three connectors 51, 52, and 53 having different shapes and positions according to the standards in force in the different countries. Here, a plug 5a having its two current-conveying connectors 51 and 52 protruding from a front surface 55 of the plug (male connectors) and having its connector 53 to ground 6 recessed from this front surface (female connector) is assumed.

Inside of plug 5a, the ends of conductors 41, 42, and 43 of a cable 4 (for example, cable 4a of FIG. 3) are connected (for example, welded, crimped, or screwed) to respective connectors 51 to 53. The assembly is enclosed in an insulating casing 58.

Such a plug is intended for a socket 7 (FIG. 11) having its (male) ground connector 73 protruding from the apparent surface of the socket so that the ground is the first connected conductor. Socket 7 is connected, by a cable 76, to an electric power supply source (not shown), for example, the distribution panel of a home installation.

In the example of FIG. 11, cable 4 has been shown as connected, by its other end, to charger 2 of a vehicle battery via a winding device 6.

Plug 5a comprises at least one temperature sensor. In the preferred embodiment shown in FIG. 10, each connector 51, 52 conveying current in normal operation (phase and neutral) is equipped with a temperature sensor 81, respectively 82. In an embodiment where a single sensor is provided, the latter is placed at closest to the connectors, for example, at mid-distance between the two connectors 51 and 52. A simple way of forming temperature sensors comprises using resistors of negative temperature coefficient (NTC). Sensors 81 and 82 are connected to an electronic circuit 85 for interpreting the temperature and, for example, for comparing this temperature with a threshold.

Preferably, circuit 85 is integrated to plug 5a and communicates with the battery charger (2, FIG. 11). Charger 2 takes into account the detected temperature to authorize or interrupt the battery charge, or even to control the charge current sampled from the facility so that the temperature of socket 7 remains acceptable and safe.

The communication between circuit 85 and charger 2 can be performed via one or a plurality of additional conductors 86 (pilot wires) provided in cable 4. According to another embodiment, this communication is performed by carrier current, by using conductors 41 and 42 (the plug then comprising a carrier current transceiver connected to conductors 41 and 42 of cable 4), which avoids a galvanic isolation of circuit 85. As a variation, circuit 85 controls at least one switch (not shown) integrated to plug 5a and interposed on conductor 41 or conductor 42, which opens the electric circuit if the temperature exceeds a predetermined threshold.

The fact of performing the temperature detection at the level of plug 5a enables to indirectly detect an excess temperature at the level of socket 7 having the plug connected thereto. Thus, when plug 5a is connected to a home installation, a temperature rise which would occur at the level of socket 7 of the installation can be detected. This enables to detect a possible fault in the installation in terms of power accepted by conductors 76 of this installation or of the electric socket 7 having plug 5a connected thereto. This is particularly advantageous in the application to the recharge of electric vehicles since, given the strong intensity required for the plug and the time taken by the connection, the risk of heating is not negligible.

The representation of FIGS. 10 and 11 is simplified and functional. The practical forming of such a plug equipped with a temperature detector is within the abilities of those skilled in the art based on the functional indications given hereabove. In particular, the determination of the temperature threshold (for example, between 50 and 80°) depends on the application.

An advantage of the embodiments which have been described is that they enable to protect and to make the recharge of an electric vehicle battery practical and comfortable, including from a non-dedicated facility, for example, a home installation.

Various embodiments have been described. Various alterations and modifications will occur to those skilled in the art. In particular, the various described embodiments and variations can be combined when they have not been disclosed as alternative.

Further, the practical implementation of the embodiments which have been described is within the abilities of those skilled in the art based on the functional indications given hereabove.

Finally, although the various embodiments have been discussed in relation with a preferred application to the recharge of a motor vehicle battery where they provide maximum benefits, they more generally apply to other applications where all or part of same problems can be encountered.

What is claimed is:

1. A winding device for an electric cable comprising a cylindrical hub, perforated at its surface and open at at least one of its ends, the cable having at least one conductor and a sheath with an outer surface having an irregular cross-section,
    wherein portions protruding from the outer surface of the sheath define air circulation spaces between turns of the cable when the latter is wound.

2. The device of claim 1, further comprising a fan blowing air in a direction approximately coaxial to the hub.

3. The device of claim 1, wherein the air circulation spaces are, along the entire length of the wound cable, axial and radial.

4. The device of claim 1, wherein the sheath comprises, at regular intervals, rings protruding from the outer surface.

5. The device of claim 1, wherein the sheath comprises a portion, protruding from its outer surface, defining a portion having non-contiguous turns coaxial to the cable.

6. The device of claim 1, comprising at one of its ends a plug integrating at least one temperature sensor.

7. The device of claim 1, comprising two ground connection conductors isolated from each other.

8. The device of claim 1, further comprising an element for rotating the hub.

9. The device of claim 1, further comprising a casing comprising at least one opening at its lower surface.

10. A system for charging at least one battery for a motor vehicle, comprising the device of claim 1.

* * * * *